United States Patent Office 2,856,367
Patented Oct. 14, 1958

2,856,367

METHOD FOR REMOVING PERIPHERAL MATERIAL FROM POROUS SOLIDS

Paul B. Weisz, Pitman, N. J., assignor to Socony Mobil Oil Company, Inc., a corporation of New York No Drawing. Application December 29, 1954
Serial No. 478,480

9 Claims. (Cl. 252—411)

This invention relates to a method for removing peripheral material from porous solids. More particularly, the present invention is concerned with the removal, to a predetermined depth, of the outer surface of porous adsorbent solid particles. Such materials are employed in a variety of industrial operations, the more important of which generally involve adsorption and/or catalysis. Thus, porous solid adsorbents find use as desiccants, zeolites, catalysts, catalyst supports, as well as in various other applications. The method of this invention, while generally applicable in removing the outer surface layers of porous adsorbent solids, is particularly useful for effecting removal of contaminant from the surface of porous catalyst particles with consequent reactivation thereof without destruction of particle form.

It is well known in catalytic hydrocarbon conversion operations in which a solid porous particulate catalyst is employed in alternate conversion and regeneration reactions, that the catalyst gradually deteriorates to a point such that further use thereof becomes an uneconomical operation. Such deterioration is due, at least in part, to the gradual accumulation on the catalyst of inorganic contaminant deposited from the hydrocarbon feed stock. Thus, siliceous cracking catalysts, including naturally-occurring activated clays and synthetically prepared composites, have long been recognized as useful in catalytically promoting hydrocarbon conversion reactions. Such siliceous catalysts generally contain silica and one or more metal oxides, such as alumina, magnesia, beryllia, and zirconia. It has heretofore been recognized that very small amounts of ash-forming heavy metal constituents, including iron, nickel, vanadium, and copper, introduced as contaminants with the feed stock or eroded from the equipment, are detrimental to the type of catalysis desired in cracking heavy petroleum fractions to lighter material such as gasoline. These metal constituents being non-combustible are not removed during the regeneration of the catalyst and accordingly tend to accumulate on the surface or within a small depth below the surface of the catalyst with accompanying poisoning of the catalyst for the desired cracking reaction. The method of this invention affords a procedure for reactivation of such poisoned catalysts by effecting removal of the outer surface of the catalyst in which the metal poisons are concentrated.

Another practical embodiment of this invention resides in the removal of a scale of iron, iron oxide, or other metallic or oxide constituents which tend to coat reforming catalysts of porous adsorbent alumina having deposited thereon a noble metal, such as platinum, palladium, ruthenium, rhodium, osmium, iridium, or mixtures thereof. Thus, as described in U. S. 2,641,582, a catalyst, comprising alumina, having deposited thereon from about 0.01 percent to about 1 percent by weight of platinum and which may contain from 0.1 percent to 8 percent by weight of halogen, becomes coated with a surface film of iron, iron oxide, or other metal contaminant upon use of such catalyst in the reforming of hydrocarbon oils. The process of this invention provides means for removing such surface contaminant from the catalyst particle without destruction of the remainder of the particle.

A further application of the process of this invention is in the regeneration or reactivation of spent hydrogenation catalysts such as, for example, nickel-containing catalysts wherein the nickel is deposited on a porous support. Catalysts of the type referred to progressively lose their catalytic activity during use and finally, after being used a number of times or for prolonged periods of time, the catalysts become inert and no longer perform their proper catalytic functions or perform such functions so slowly as to be of no practical importance. It has been commonly considered that the deterioration of such hydrogenation catalysts is due to changes in the surfaces of the catalyst particles attributable primarily to the combination with the highly sensitive catalytically active surfaces of certain substances which produce catalytically inert compounds. Thus, sulfur and sulfur compounds, as well as compounds of phosphorus and arsenic, are, for certain catalysts, highly active catalyst poisons and a very minute quantity of such catalyst poisons may serve to convert a relatively large amount of catalyst into an inactive condition since only a very thin film of inactive compound of the contaminating metal is required to render the catalytic surface inactive. It has heretofore been proposed that when such catalysts have become spent to separate them from the oil or other material with which they have been used and then to recover or regenerate the metal catalysts by chemical means, such as solution of the spent metal catalysts in acid, conversion of the dissolved metal into the form of a reducible metal compound and reduction thereof by hydrogen at elevated temperature. Such chemical means of recovery or regeneration, involving solution and usually precipitation and subsequent reduction by hydrogen, are unnecessary. The spent catalysts can be regenerated or reactivated by more simple methods embodying the present invention.

Various other techniques have been suggested to remove inorganic contaminant from porous adsorbent contact material. In general, such techniques have involved rather drastic measures, including chemical attack on the metal or other inorganic contaminant. In some cases, excessive heat treatment has been suggested for removing the metal contaminant despite the danger of surface destruction in the catalyst due to sintering. It has also been proposed to subject particles of the contaminated catalyst or other porous particle-form solid from which it is desired to remove peripheral material to a surface grinding operation in which a thin layer of the outer surface is ground from the particles. Such operations have the disadvantage of resulting in excessive breakage of the particle form so that the resultant product is largely a finely pulverized material.

In accordance with the present invention, a method has been discovered for removing surface material from porous solids without the aforesaid disadvantages inherent in previously proposed processes. The process of this invention comprises bringing the porous solid from which it is desired to remove peripheral material into contact with a molten wax so that the molten wax penetrates into the pores of the solid to at least a depth corresponding to the depth of peripheral material to be removed. The porous solid is then removed from contact with the molten wax. The wax contained in the pores of the solid is allowed to solidify and the solid containing the solidified wax is contacted with a wax solvent for a period of time sufficient to dissolve wax from the pores of the solid to the depth of peripheral material to be removed. The solid, after such exposure to the solvent, is contacted with a polar liquid. If the wax solvent employed was a polar material, subsequent contact with said polar liquid is unnecessary. The solid is then dried. Upon treating the porous solid as above described, it is found that the outer surface thereof scales off as a finely divided powder to an extent equivalent to the depth of wax dissolution, leaving the remainder of the solid unaffected. The process of this invention thus affords a method for removing peripheral material from a porous solid without adverse effect on the remainder of the porous solid, thereby providing a resultant product slightly smaller, to the extent of the removed surface material, but of substantially the same form and shape as the original solid.

The above process is contemplated as being broadly applicable for removing peripheral or surface material from a rigid porous solid. Thus, porous clays, inorganic gels, gelatinous precipitates, porous glasses and activated carbon are typical of the porous solids which may be treated in accordance with the present process. The particular chemical composition of the porous solid being treated does not appear to be critical. From a practical standpoint, materials to which the method is most specifically applicable are hydrous oxide compositions, including inorganic oxide gels and activated clays, a major portion of which consists of silica, alumina, or combinations thereof. Such materials as discussed hereinabove are widely used as catalysts and catalyst supports. These materials may be in massive form or in the form of irregularly shaped particles but, more generally, are in the form of uniformly shaped particles, such as pellets, spheres, cylinders, and the like.

The initial step in the instant process involves contact of the porous solid with molten wax. Such contact may be effected in any convenient fashion, including static or continuous processing, such as by spraying or painting the solid with molten wax, rolling or otherwise passing particles of the solid through a layer of the molten wax, pouring molten wax over the solid or by immersion of the solid in a bath of the molten wax. Generally, the latter method of contact is preferred. The temperature of contacting the wax and porous solid may be any temperature above the wax melting point, the upper limit being a temperature at which the molten wax or solid may be adversely affected by vaporization, carbonization, sintering, etc. The particular temperature at which contact is carried out is not considered to be a critical feature of the invention, providing, of course, the above precautions are observed. Generally, as a practical matter, the temperature will be slightly above the melting point of the particular wax employed, i. e., usually in the approximate range of 5 to 50° C. above the wax melting point. The wax employed may be of plant, animal or mineral origin. Typical waxes include beeswax, spermaceti, Chinese wax, carnauba wax, ozocerite, and paraffin wax. It is essential to the success of the present process that the molten wax penetrates into the pores of the solid to at least a depth corresponding to the amount of peripheral material to be removed. Preferably, the wax is permitted to penetrate into the pores of the solid to a depth greater than that corresponding to the amount of outer surface material which is to be removed. The porous solid may thus be completely or partially filled with the molten wax. Where the porous solid is only partially filled, naturally a smaller amount of wax and less effort for subsequently removing excess wax from the solid is required.

After the solid is filled with molten wax to the desired extent, it is removed from contact therewith, freed from externally adhering wax and allowed to cool to solidify the wax.

The wax-containing solid is subsequently brought into contact with a solvent capable of dissolving the wax without effecting dissolution or otherwise adversely affecting the solid for a controlled length of time sufficient to dissolve wax from the pores of the solid to the depth of peripheral material to be removed. The wax solvent employed may be either of the polar or non-polar type. If the latter, then the solid is necessarily contacted with a polar liquid subsequent to dissolution of the wax but prior to drying. If the wax solvent is of the polar type, then the solid having wax dissolved therefrom as above described may, after removal from the polar solvent, be dried without further treatment. It is, however, an essential step in the present process that the solid, before drying, be contacted with a polar liquid. Such liquid may be that employed as a solvent for dissolution of the wax or may be a polar liquid incapable of effecting dissolution of the wax, in which case a preliminary solvent of the non-polar type will have been used for effecting the desired wax removal. Representative polar wax solvents include ketones, such as acetone and methyl ethyl ketone; ethanol and higher molecular weight alcohols; aldehydes; etc. Typical non-polar wax solvents include carbon tetrachloride, cyclohexane, benzene, naphtha and thiophene. Representative polar liquids, incapable of attacking the wax and employed after dissolution of the wax with a non-polar solvent, include water and methanol.

The amount of peripheral material removed as a fine powder from the porous solid after the above-described treatment will depend upon the type and polarity of the solvent or liquid employed, the time allowed for the solvent to attack internal wax and the severity of the subsequent drying operation. Other conditions remaining constant, a greater amount of peripheral material will be removed the greater the polarity of the liquid in contact with the solid prior to the drying operation. The time during which the solvent and wax-containing solid remain in contact likewise will affect the extent of surface removal. Since such period will depend on the depth of peripheral material which it is desired to remove, it is evident that no specific time limitations can be set for dissolution of the wax from the pores of the solid. As a practical matter, however, under ordinary conditions, the time allowed for the solvent to attack internal wax will generally be between about 5 seconds and about 15 minutes. The temperature at which the solid having wax dissolved therefrom is dried also affects the amount of peripheral matter removed. Generally, other conditions remaining constant, the higher the drying temperature, the greater is the extent of solids removal. Such drying temperature may range from ambient temperature up to a temperature at which the particular porous solid undergoing treatment is adversely affected by sintering. Thus, for clays, the upper temperature limitation is in the range of 1000–1200° F., while for inorganic oxide gels the temperature may go as high as 1400° F.

The peripheral material removed as a result of the above treatment scales off the main body of porous solid as a finely divided powder. Removal of the material may be facilitated by air-blowing, screening, or agitation. Any wax remaining in the porous solid may be removed by solvent extraction, by evaporation and combustion of the wax, or by other feasible means.

Having described the general nature of this invention, the following non-limiting examples will serve to illustrate the same:

EXAMPLE 1

Fifty grams of spheroidal particle-form silica-alumina cracking catalyst which had been discarded from a catalytic cracking unit, as containing an excessive amount of metal contaminant, were immersed in molten paraffin wax for approximately 10 minutes, at which time the liquid wax had penetrated throughout the particles. The major portion of the catalyst was of a particle size passing a 5-mesh and retained on a 7-mesh screen. The solid particles were removed from the molten wax, allowed to drain while hot and cooled to room temperature. The particles now containing solid wax were immersed in acetone for one-half minute at room temperature, removed and dried on a tray at room temperature. To remove all material which had been loosened from the surface, the particles were gently shaken for one minute in a closed vessel and resulting powder was separated by screening through a 10-mesh sieve. The powder obtained constituted 1.7 percent by weight of the entire material. Wax was thereafter removed from the interior of the particles by evaporation and combustion of the wax in a furnace at a temperature of 1000° F. for 16 hours. The remaining spheroidal catalyst particles were substantially without fractures.

EXAMPLE 2

The process of Example 1 was repeated except that the acetone-contacted particles were dried at a temperature of 160° C. The amount of powdered surface material thus obtained was 13 percent by weight of the original catalyst charge.

EXAMPLE 3

The process of Example 1 was repeated except that, in place of acetone, the solvent employed was methyl cyclohexane. No measurable quantity of powder was obtained.

EXAMPLE 4

The process of Example 1 was repeated except that the step of solvent treatment was omitted. No measurable quantity of powder was obtained.

EXAMPLE 5

The process described in Example 1 was applied to four catalyst samples with the exception that the wax was allowed to penetrate only to a distance corresponding to about one-quarter radius of the particles, thus requiring a smaller amount of wax and less effort for removing the same subsequently. The acetone exposure time was varied in duration, as indicated for Runs 2 to 5 in Table I below. The amount of powder removed and the nickel content thereof are shown. The nickel in this case is a contaminant and it will be evident from the data that the nickel was concentrated on and near the surface of the contaminated catalyst particles.

*Table I*

| Run No. | Acetone Contact, Minutes | Powder Removed, Wt. Percent of Original | Nickel, p. p. m. |
|---|---|---|---|
| 1 | 0 | 0 | |
| 2 | 3 | 7.6 | 720 |
| 3 | 6 | 10.3 | 520 |
| 4 | 9 | 14.9 | 508 |
| 5 | 10 | 15.7 | |
| 6 | 10 | 20.2 | 226 |

Two control runs were included, one with no acetone treatment (run No. 1) and one with particles which were completely filled with wax (run No. 6).

The above examples serve to illustrate the manner in which the method of the invention can be employed. In particular, Examples 1 and 2 demonstrate the effect of drying severity. Example 4 shows that the solvent treatment is an essential step. Example 3 shows that a nonpolar solvent, although capable of dissolving a wax, is ineffective in accomplishing the desired removal of surface material. Example 5 demonstrates the controllability of the depth of attack on the solid by varying the time of interaction with the solvent. In addition, the data of Example 5 established that limited penetration of the surface to be removed by wax without the need of filling all of the particle volume can be successfully practiced.

Without being limited by any theory, it is believed that the disintegrating action accomplished by the process of the invention is due to a combination of two effects: first, the removal or softening of solid wax contained in the pores of the solid to a given depth, leaving the remaining solid core prestressed due to contraction of the wax on solidification in comparison to the wax-free external shell; and, secondly, the action of the surface tension forces at the liquid vapor-interface during drying within the empty shell and near the prestressed boundary.

The above concept leads to another embodiment of the invention, illustrated by Example 6 below. In the foregoing examples, the polar solvent of acetone accomplished both the creation of a substantially wax-free boundary shell and the creation of surface tension forces during subsequent drying. It is possible to accomplish the two functions in two independent steps as shown by:

EXAMPLE 6

Fifty grams of the catalyst described in Example 1 were immersed in molten paraffin wax for about 10 minutes, at which time the wax had filled the pores of the particles. The solid particles were then removed, allowed to drain while hot, and cooled. The particles filled with solid wax were contacted with methyl cyclohexane for 1.5 minutes at room temperature, removed, and dried for two minutes in air. The particles were thereafter briefly immersed in water and then dried at room temperature. Powder, amounting to about 3 percent by weight of the original catalyst, was scaled off as a result of such treatment.

In the above example, methyl cyclohexane previously shown to be an ineffective solvent (Example 3) was given the task of limited wax removal and water was used as the drying solution to disintegrate the surface material. Employing such procedure, the depth of solids removal is controlled by the depth of wax removal, i. e., the contact time and nature of the solvent employed before subsequent contact with a polar liquid.

I claim:

1. A method for removing peripheral material from a porous solid, which comprises bringing said solid into contact with molten wax under conditions such that the molten wax penetrates into the pores of the solid to at least a depth corresponding to the amount of peripheral material to be removed, removing the porous solid from contact with the molten wax, effecting solidification of the wax contained in the pores of the solid, contacting the solid containing solidified wax with a polar wax-solvent for a period of time sufficient to dissolve wax from the pores of the solid to the depth of peripheral material to be removed and thereafter drying the solid, whereby the outer surface of said solid is removed as a finely divided powder without adverse effect on the remainder of the porous solid.

2. A method for removing peripheral material from a solid porous adsorbent, comprising filling the pores of said adsorbent with molten wax, effecting solidification of said wax within the pores of said adsorbent, extracting wax from said adsorbent with a polar solvent therefor to the depth of peripheral material to be removed, and thereafter drying the solid, whereby the outer surface of said solid is removed as a finely divided powder and subsequently removing remaining wax from the interior of said adsorbent.

3. A method for removing peripheral material from a porous solid, which comprises bringing said solid into contact with molten wax under conditions such that the molten wax penetrates into the pores of the solid to at least a depth corresponding to the amount of peripheral material to be removed, removing the porous solid from contact with the molten wax, effecting solidification of the wax contained in the pores of the solid, contacting the solid containing solidified wax with a non-polar wax-solvent for a period of time sufficient to dissolve wax from the pores of the solid to the depth of peripheral material to be removed, contacting the solvent-treated solid with a polar liquid and thereafter drying the solid, whereby the outer surface of said solid is removed as a finely divided powder without adverse effect on the remainder of the porous solid.

4. A method for removing peripheral material from a porous solid, which comprises filling the pores of said solid with molten wax, effecting solidification of said wax within the pores of said solid, extracting wax from the pores of said solid with a non-polar solvent therefor to the depth of peripheral material to be removed, contacting the solvent-treated solid with a polar liquid and thereafter drying the solid, whereby the outer surface of said solid is removed as a finely divided powder, and subsequently removing the remaining wax from the interior of said solid.

5. A method for removing peripheral material from an inorganic oxide gel, which comprises bringing said gel into contact with molten wax so that the wax penetrates into the pores of the gel to at least a depth corresponding to the amount of preipheral material to be removed, removing the gel from contact with the molten wax, effecting solidification of the wax contained in the pores of the gel, exposing the gel containing solidified wax to a polar wax-solvent for a period of time sufficient to dissolve wax from the pores of the gel to the depth of peripheral material to be removed and thereafter drying the gel, whereby the outer surface of said gel is removed as a finely divided powder without adverse effect on the remainder of the gel.

6. A method for regenerating a spent porous adsorbent catalyst, which comprises resurfacing the same by filling the pores of the catalyst to at least a depth corresponding to the amount of surface material to be removed, effecting solidification of the wax contained in the pores of the catalyst, contacting the catalyst containing solidified wax with a polar wax-solvent for a period of time sufficient to dissolve wax from the pores of the catalyst to the depth of surface material to be removed and thereafter drying the catalyst, whereby the outer surface of said catalyst is removed as a finely divided powder.

7. A method for removing contaminant concentrated in and near the surface of a porous adsorbent particle-form catalyst, which comprises bringing particles of said catalyst into contact with molten wax under conditions such that the wax penetrates into the pores of the catalyst to at least a depth corresponding to the depth of surface contaminant, removing the catalyst particles from contact with the molten wax, effecting solidification of the wax contained in the pores of the particles, contacting the particles containing solidified wax with a polar wax-solvent for a period of time sufficient to dissolve wax from the pores of the particles to the depth of surface contaminant to be removed and thereafter drying the catalyst particles, whereby the outer surface of said particles is removed as a finely divided powder without adverse effect on the remainder of the particle-form catalyst.

8. A method for reactivating a porous metal-poisoned cracking catalyst, which comprises filling the pores of said catalyst with molten wax, effecting solidification of said wax within the catalyst pores, extracting wax from the catalyst with a polar wax-solvent to the depth of metal poison to be removed and thereafter drying the catalyst, whereby the outer surface of said catalyst in which the metal poisons are concentrated is removed in the form of a finely divided powder.

9. A method for reactivating an inorganic oxide gel cracking catalyst which has become deactivated by the accumulation of inorganic contaminant on and near the surface thereof, which comprises bringing said catalyst into contact with molten wax under conditions such that the molten wax penetrates into the pores of the catalyst to at least a depth corresponding to the depth of said inorganic contaminant, removing the catalyst from contact with the molten wax, effecting solidification of the wax contained in the pores of the catalyst, contacting the catalyst containing solidified wax with a polar wax-solvent for a period of time sufficient to dissolve wax from the pores of the catalyst to the depth of said inorganic contaminant and thereafter drying the catalyst, whereby the outer surface of said catalyst containing the major portion of inorganic contaminant is removed in the form of a finely divided powder.

References Cited in the file of this patent

UNITED STATES PATENTS

| | | |
|---|---|---|
| Re. 16,225 | Wooster | Dec. 15, 1925 |
| 1,892,283 | Manley | Dec. 27, 1932 |
| 1,905,087 | Goebel | Apr. 25, 1933 |
| 2,159,140 | Eckell et al. | May 23, 1939 |
| 2,436,568 | Griffin et al. | Feb. 24, 1948 |
| 2,495,729 | Hutson et al. | Jan. 31, 1950 |